W. B. FEATHERSTONE.
OPTICAL PROJECTOR.
APPLICATION FILED DEC. 21, 1915.
1,199,460.
Patented Sept. 26, 1916.
2 SHEETS—SHEET 1.
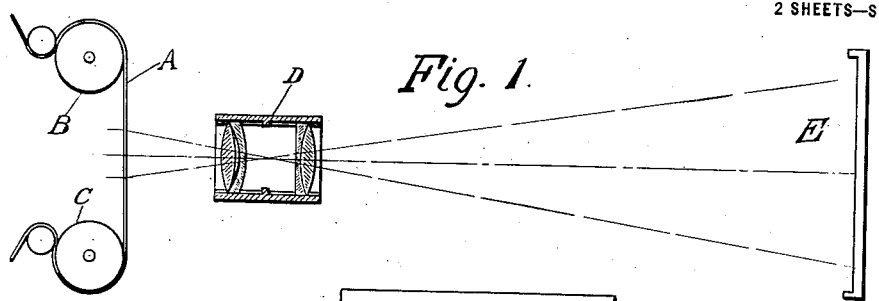
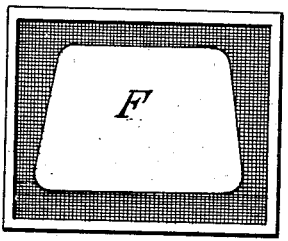
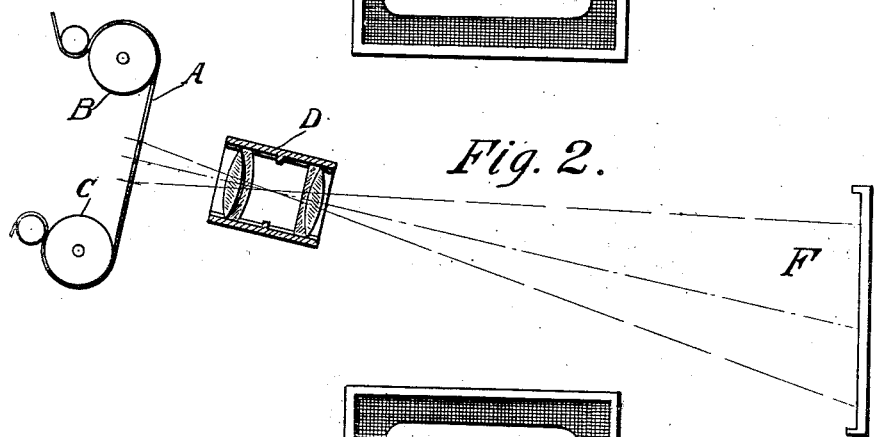
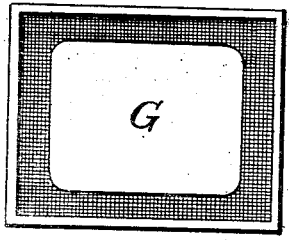
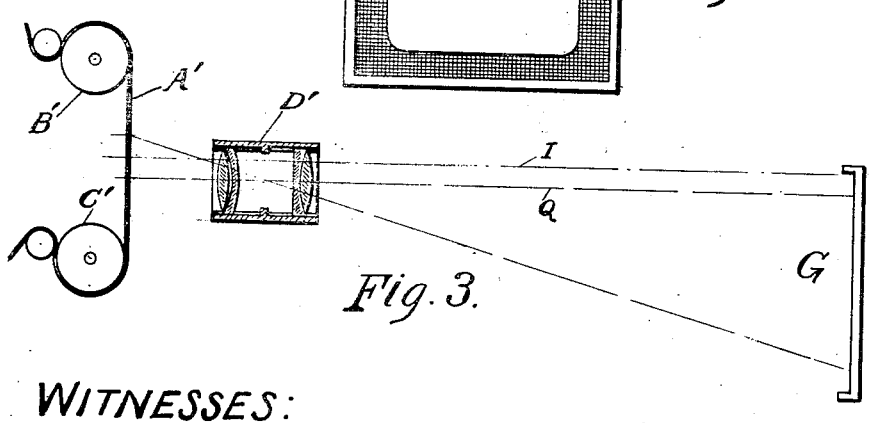
WITNESSES:
Lewis Bruce
J. R. Bagley
INVENTOR:
Willard B. Featherstone W. B. FEATHERSTONE.
OPTICAL PROJECTOR.
APPLICATION FILED DEC. 21, 1915.
1,199,460.
Patented Sept. 26, 1916.
2 SHEETS—SHEET 2.
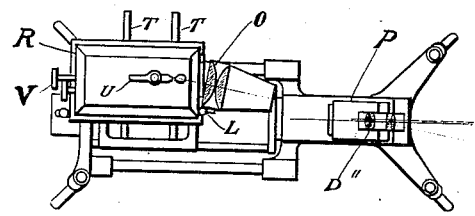
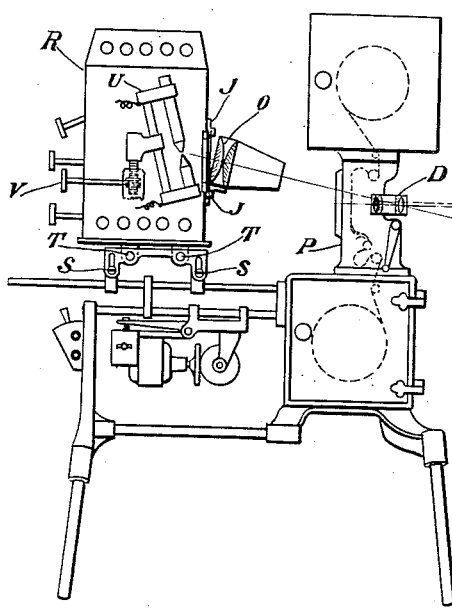
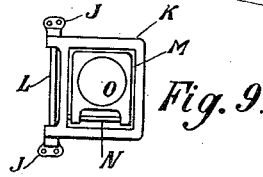
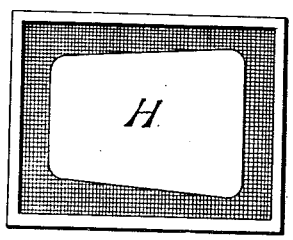
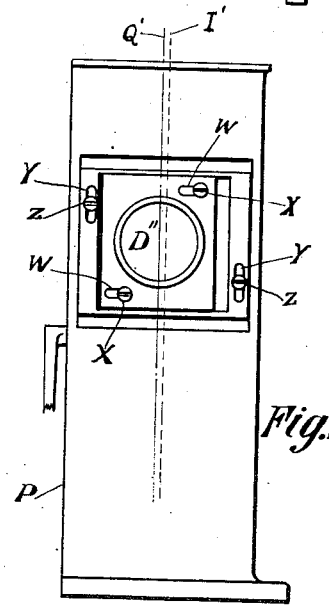
Witnesses:
Lewis Bruce
J. R. Bagley
Inventor
Willard B. Featherstone

UNITED STATES PATENT OFFICE.

WILLARD B. FEATHERSTONE, OF WASHINGTON, DISTRICT OF COLUMBIA.

OPTICAL PROJECTOR.

1,199,460.  Specification of Letters Patent.  Patented Sept. 26, 1916.

Application filed December 21, 1915. Serial No. 67,975.

*To all whom it may concern:*

Be it known that I, WILLARD B. FEATHERSTONE, a resident of Washington, in the District of Columbia, have invented certain new and useful Improvements in Optical Projectors, of which the following is a specification.

My invention relates particularly to the projection of pictures upon a screen as by a stereopticon or a motion picture machine and has for its object to make it possible to project a true image even when the projecting device may not be directly opposite the screen. It has heretofore been customary either to tilt the projecting machine or stereopticon or to tilt the screen, or both, but such practice is very unsatisfactory as the image is thereby distorted and partly out of focus. By my new invention neither the screen nor the projection apparatus need be tilted as I provide means for adjusting the projection lens so that the image may be thrown to one side or up or down while the slide or film and the screen remain parallel. Thus a rectangular image upon the slide or film will be projected and appear as a rectangular image upon the screen.

In the accompanying drawings I have illustrated first in a general way the principle of parallel-plane projection, and then the application of my invention to a modern cinematographic projector.

Figure 1, indicates the normal arrangement of positive, objective and screen. Fig. 2, shows how the positive plate or film and the objective are both tilted forward when the center of the screen is below the optic axis of the lens. Fig. 3, illustrates the principle of lowering the lens only, while the positive and the screen remain parallel. Fig. 4, shows the distortion of the projected image caused by the tilting shown in Fig. 2. Fig. 5, shows how a true rectangular image can be projected upon the same screen as in Fig. 2, by means of my invention. Fig. 6, (Sheet #2), shows the distortion of a projected image when the screen is over to one side and therefore not parallel with the plane of the positive image in the projector. Fig. 7, shows the application of my invention to a modern projecting machine, the projecting lens being out of normal position sidewise, to correct the distortion shown in Fig. 6. Fig. 8, shows the same machine with the lens lowered vertically to correct the distortion shown in Fig. 4. Fig. 9, shows one method of tilting the condensers of the projecting machine by means of a double hinge. Fig. 10, is a front view of the projector-head, showing one means of adjusting the projection lens vertically and horizontally.

In Figs. 1, and 2, A is a motion picture film carried upon the rollers or sprockets B, C. D is an ordinary projection lens, and E, and F are screens upon which the images are projected. In Fig. 1, a screen E, is directly perpendicular to the optic axis of the lens D, and parallel with the film A, and hence the projected images will be of the same form as those on the film. This is shown in G, Fig. 5. In Fig. 2, is shown the result of the usual practice of tilting the entire projecting machine so that the film is not parallel nor the optic axis of the lens perpendicular to the screen F. This results in the distortion indicated by F, Fig. 4.

In Fig. 3, the screen G, bears the same relation to the projecting machine as that shown in Fig. 2, with the exception that the machine has not been tilted, but the lens D', has been lowered to such an extent that a line drawn from the center of the picture on the film to the center of the screen will pass through the effective center of the lens. This does not cause any appreciable distortion, provided the lens has a reasonable flat field, whose "image circle" must of course embrace the new position of the picture aperture relative to the lens. To accomodate extreme conditions, or to get the best average results with a poorly corrected lens, the lens itself may be tilted through an angle of a few degrees, so that its optic axis will not be precisely perpendicular to the screen, as shown in Fig. 3, but at an angle corresponding with the curvature of its field, or to permit a greater degree of adjustment of a lens of narrow angle, or small relative aperture, while the picture-surface and the screen remain parallel.

In Fig. 7, P is the head of a modern motion picture machine, and R is a lamp-house containing the arc lamp U, which has the usual adjustments, including one for raising and lowering by turning the hand wheel V. The condensers O, are shown mounted in a double hinge which is more clearly illustrated in Fig. 9, in which the part M, carrying the condensers O, swings within the frame K, upon the rod N. This frame K, in turn swings upon the rod L, which is mounted in the lugs J, J. This arrangement makes it possible to swing the condensers in any desired angle, horizontally or vertically. In Fig. 7, the condensers O are swung slightly in a horizontal plane while the projecting lens D'' is simply shifted to one side and fastened in position by means of the screws X, X in Fig. 10. These screws and the screws Z, Z in Fig. 10 coöperate with the slots W, W and Y, Y to fasten the holder for the lens D'' in any desired position on the front of the projector-head P.

In Fig. 8, the condensers O are tilted through a small angle in the vertical plane while the projection lens D' is simply lowered as described above. The lamp-house L, has been raised to the position shown in Fig. 8 and fastened there by means of screws S, S, while the arc lamp U has also been raised slightly above its normal position so that it will be in line with the center of the film picture, the lens and the screen. The reason for tilting the condensers instead of lowering them in the same plane as is done with the projection lens is that on account of the high convexity, large aperture and uncorrected aberrations of condensing lenses, the arrangement as illustrated gives a better "spot". A similar adjustment of the lamp-house, but sidewise instead of vertically is required with the arrangement shown in Fig. 7, and this is accomplished simply by sliding the lamp-house support upon the customary guide rods T, T. The necessary adjustment of the arc lamp is similarly made by the means ordinarily provided for that purpose.

In cases where the screen is centered below the projector and also to one side, it is readily seen that a combination of the adjustments shown in Figs. 7, and 8, would provide for practically any condition. Of course there might be extreme conditions where the screen would be so far below or to one side that complete adjustment would be very difficult if not impossible. In such cases however, the required adjustments would be made to the greatest practicable extent, and then a very little tilting either of the screen or the projecting machine should suffice to complete an arrangement which would be vastly more satisfactory than the customary procedure in such cases.

In Figs. 7, and 8, the normal optic axis of the projection lens is indicated by a dotted line I, while the position of the optic axis after adjustment is indicated by a dot and dash line Q. Similarly in Fig. 10, the dotted line I', crosses the normal optic axis, while the dot and dash line Q' crosses the optic axis of the lens as shown.

It will be noted that a comparatively slight shift of the lens will accommodate any ordinary position of the screen.

I claim:—

1. In an optical projector comprising a lens, means to hold a picture surface at one focus of the lens, a radiant, and a condenser, having their centers substantially in line with those of the lens and the picture surface; means to adjust the lens in a plane substantially parallel with the picture surface, and means to alter the relative positions of the radiant, the condenser, the picture surface and the lens, so that their centers shall remain substantially in line when the lens is adjusted.

2. In an optical projector comprising a lens, means to hold a picture surface at one focus of the lens, a radiant, and a condenser; means to adjust the lens in a plane substantially parallel with the picture surface, means to move the radiant and the condenser oppositely to the movement of the lens, and means to tilt the condenser so that its axis may be made to approximate a line joining the radiant and the center of the lens.

3. In an optical projector comprising a lens, a condenser, a radiant, and means to hold a picture surface at one focus of the lens; the combination with means to adjust the lens in a plane substantially parallel with the picture surface, of means to move the radiant and the condenser oppositely to the movement of the lens and in planes similarly parallel, and means to tilt the condenser so that its axis may be made to approximate a line joining the radiant and the center of the picture surface and the effective nodal point of the lens.

4. In an optical projector comprising a lens, an adjustable radiant, an adjustable condenser, and means to hold a picture surface at one focus of the lens; means to adjust the lens in a plane substantially parallel with the picture surface, and means to tilt the axis of the condenser comprising a hinged frame or holder substantially as described.

WILLARD B. FEATHERSTONE.

In presence of—
Lewis Bruce,
J. R. Bagley.